United States Patent

Tsuruta et al.

[11] Patent Number: 6,038,237
[45] Date of Patent: Mar. 14, 2000

[54] VOICE SIGNAL TRANSMITTING METHOD AND EXCHANGE SYSTEM USING THIS

[75] Inventors: Hidekazu Tsuruta; Keiichi Obara, both of Tokyo, Japan

[73] Assignee: Kabushiki Kaisha Toshiba, Kanagawa, Japan

[21] Appl. No.: 08/860,024

[22] PCT Filed: Nov. 11, 1996

[86] PCT No.: PCT/JP96/03304

§ 371 Date: Jul. 3, 1997

§ 102(e) Date: Jul. 3, 1997

[87] PCT Pub. No.: WO97/17785

PCT Pub. Date: May 15, 1997

[30] Foreign Application Priority Data

Nov. 10, 1995 [JP] Japan ................................. 7-293097

[51] Int. Cl.[7] .................................................. H04J 3/00
[52] U.S. Cl. ......................... 370/468; 370/395; 370/398
[58] Field of Search ................................. 370/395, 397, 370/398, 399, 465, 468, 230, 458, 470, 471, 472, 473

[56] References Cited

U.S. PATENT DOCUMENTS 4,519,073  5/1985  Bertocci et al. ..................... 370/118

5,675,574 10/1997 Norizuki et al. ..................... 370/230
5,761,197  6/1998 Takefman ........................... 370/458

FOREIGN PATENT DOCUMENTS

60-14540   1/1985  Japan .
2-57034    2/1990  Japan .
3-109841   5/1991  Japan .
4-249447   9/1992  Japan .
5-122241   5/1993  Japan .

*Primary Examiner*—Dang Ton
*Assistant Examiner*—Tuan Ho
*Attorney, Agent, or Firm*—Finnegan, Henderson, Farabow, Garrett & Dunner, L.L.P.

[57] ABSTRACT

This relates to a voice signal transmitting method and exchange system using this whereby excellent speech quality can be maintained by reducing the celling delay on voice compression and celling/decelling delay on relay-exchanging. Voice compression/framing/celling units 20A, 20B, 20C corresponding to ATM exchanges 10A, 10B, 10C within the network are provided. When a call is made between telephone set 50-1 and telephone set 50-3 or 50-5, voice compression/framing/celling unit 20A distributes the voice signal that is input from PBX 30A to each remote party PBX 30B, 30C; the voice signal distributed to each of these remote stations is compressed, and, at fixed time intervals, only busy channels are multiplexed on to a variable-length TDM frame, this multiplexed frame being then converted into ATM cell form at each PBX 30B, 30C and transferred from ATM exchange 10A to ATM exchange 10B or 10C.

6 Claims, 6 Drawing Sheets

Prior Art

VOICE SIGNAL TRANSMITTING METHOD AND EXCHANGE SYSTEM USING THIS

TECHNICAL FIELD

The present invention relates to a method of voice signal transmission in a network using ATM (Asynchronous Transfer Mode) exchanges, and to an exchange system using this.

BACKGROUND ART

Figure 4:
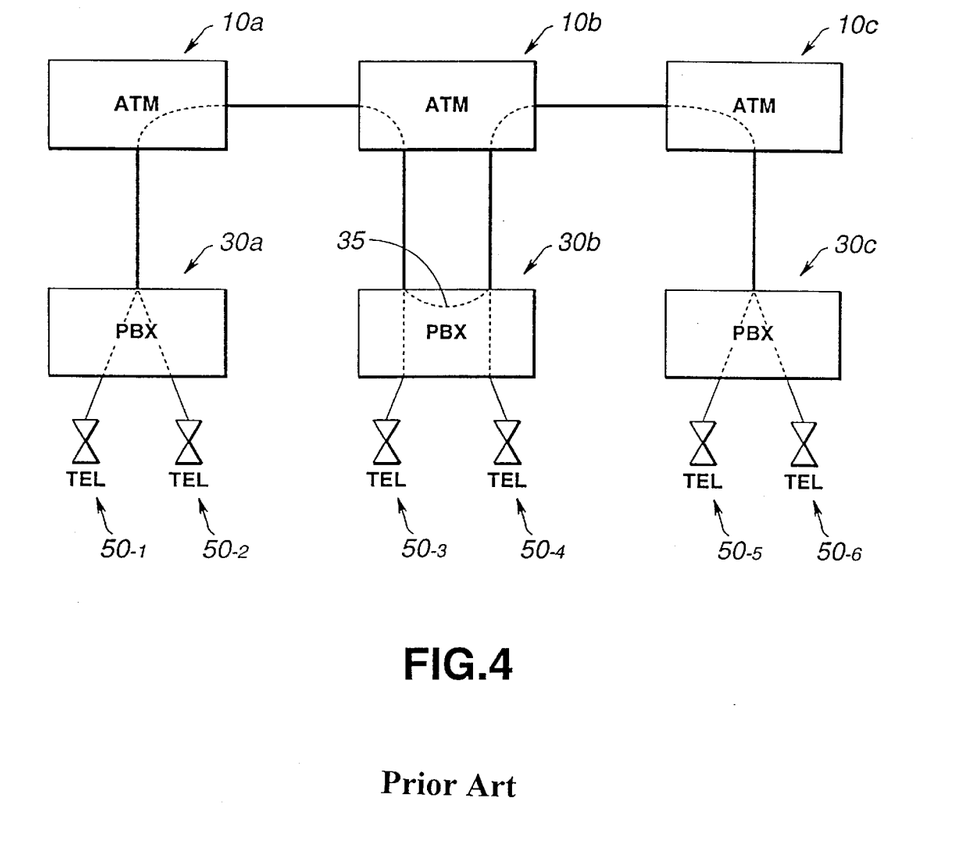
FIG. 4 is an overall layout diagram of a prior art ATM system.

FIG. 4 shows a typical layout of a prior art network of this type. In this Figure, symbols 10a, 10b, and 10c are ATM exchanges, symbols 30a, 30b, and 30c are exchanges equipped with a voice compression function (PBXs), and symbols 50-1, 50-2, 50-3, 50-4, 50-5, and 50-6 are telephone sets. Also, the dotted line portions in ATM exchanges 10a, 10b, 10c and PBXs 30a, 30b, 30c are through-routes; in particular, symbol 35 in PBX 35 indicates a relay route when a voice signal is relay-exchanged by the corresponding PBX 30b.

Next, the case will be described in which compressed voice is transferred by such a prior art network. For example, when a call is made between telephone set 50-1 and telephone set 50-3, a telephone call originated by telephone set 50-1 is transferred in the order: PBX 30a, ATM exchange 10a, ATM exchange lob, and PBX 30b, before arriving at telephone set 50-3. In this case, all the processing of the call connection information is performed between PBX 30a and PBX 30b.

The operation of PBX 30a, ATM exchange 10a, ATM exchange 10b, and PBX 30b in this case will now be described in more detail. In the present description, it will be assumed that connection between PBX 30a and ATM exchange 10a and connection between ATM exchange 10b and PBX 30b is effected by a typical interface TTC 2 Mbps interface.

Figure 2A:
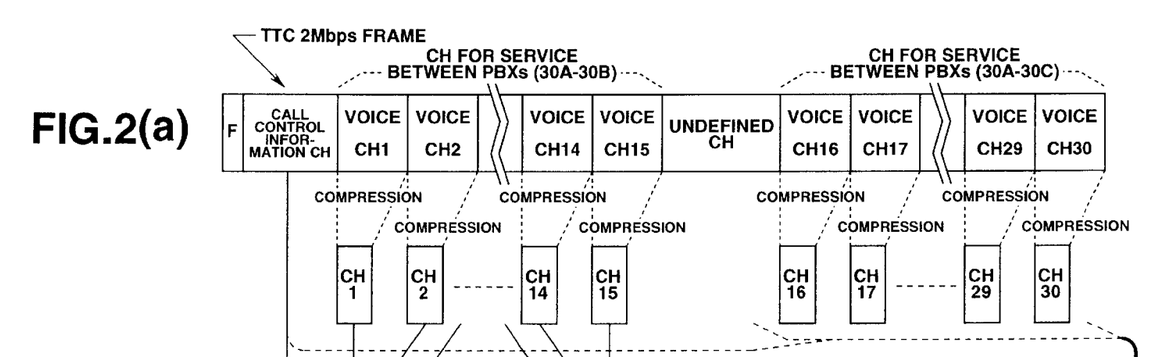
Figure 5:
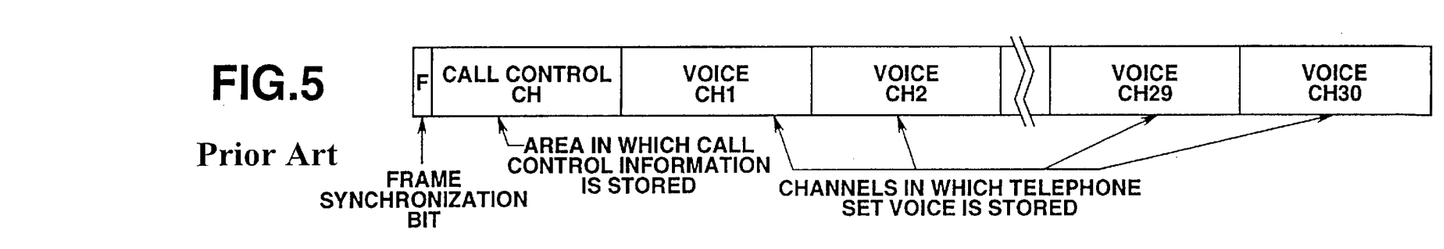
FIG. 5 is a diagram showing an example frame format on non-compressed voice transfer using a prior art ATM system PBX/ATM exchange interface.

FIG. 5 shows an example of the frame format of a TTC 2 Mbps interface; this is constituted by providing a frame synchronization bit F at the head, followed by one 64 kbps channel, a call control ch (channel), voice ch (channels) 1 to 30, and, in addition, an undefined channel [see FIG. 2(a)] 1ch, not particularly shown in this Figure.

In the case where voice compression is not performed by PBX 30A, PCM (64 kbps) voice is accommodated by the above voice ch, so these channels are of 8-bit type (8 Khz×8 bit).).

Figures 6, 7A:
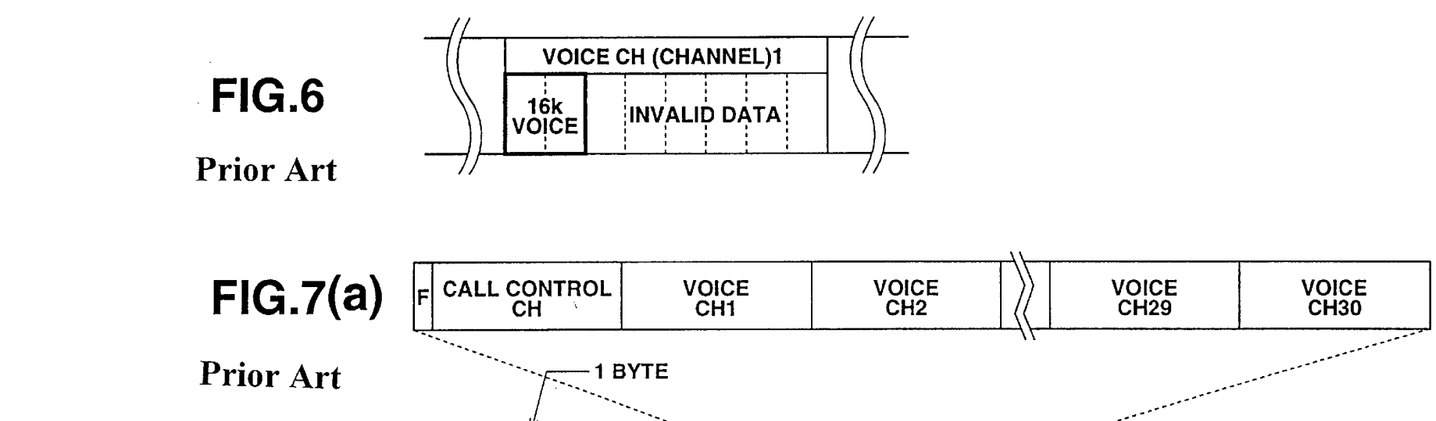
FIG. 6 is a diagram showing an example frame format on compressed voice transfer using a prior art ATM system PBX/ATM exchange interface.
FIG. 7(a) and 7(b) are frame layout diagrams given in explanation of ATM celling processing on transferring non-compressed voice in a prior art ATM system.

In contrast, if voice compression is performed by PBX 30A (in this example, 16 kbps compression), compressed voice allocation (16 kbps compressed voice) as shown for example in FIG. 6 is performed within each voice ch (channel); compressed voice is entered in the amount of 2 bits at the head, invalid data being inserted for the remaining 6 bits.

Usually, when a voice signal is transferred by PBX 30A without compression, at the next-stage ATM exchange 10A, as shown in FIG. 7, the frame signal (see FIG. 7(a)) of the TTC 2 Mbps interface sent from PBX 30A constitutes a continuous signal which is directly converted into cells in the AAL (ATM Adaptation Layer) type 1 before being transferred.

Figure 7B:
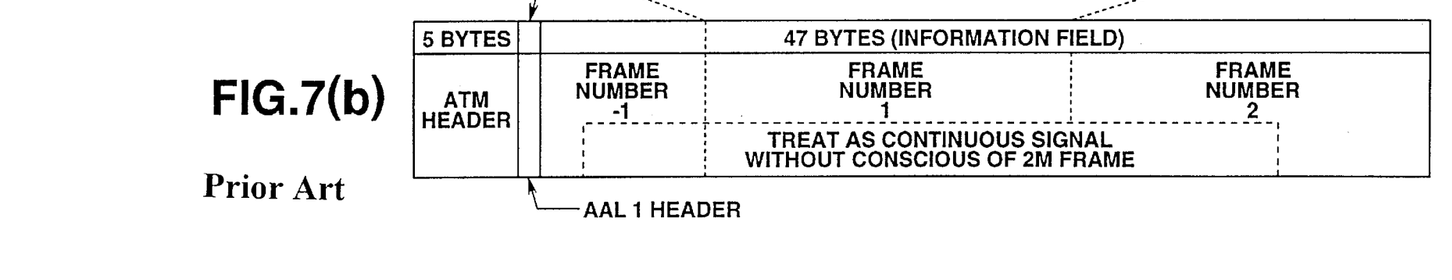

An ATM cell (see FIG. 7(b)) generated by this cell conversion consists of a total of 53 bytes, consisting of a 5-byte "ATM header", in which control information such as its destination is stored, and a 48-byte "information field" containing user data. An ATM cell in which a TTC 2 Mbps interface frame is directly inserted in this information field is transferred from ATM exchange 10A to remote ATM exchange 10B.

Figure 8A:
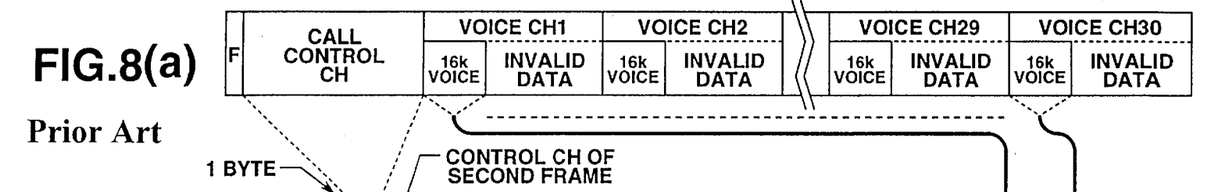
Figure 8B:
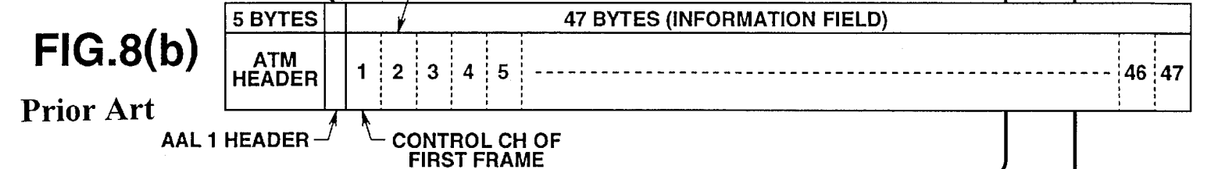
Figure 8C:
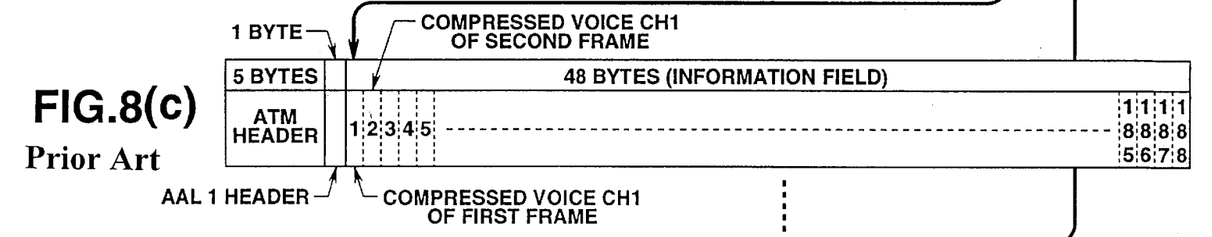
Figure 8D:
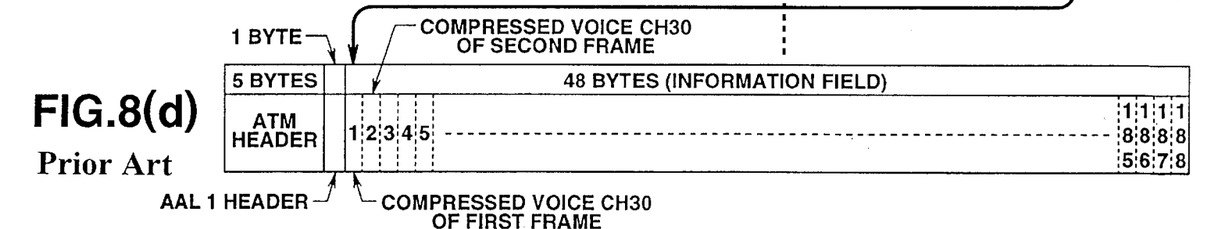

In contrast, when transfer is effected by PBX 30A with voice compression, at ATM exchange 10A, as shown in FIG. 8, each of the ch on the TTC 2 Mbps interface frame signal (see FIG. 8(a)) sent from PBX 30A, for example call control ch (see FIG. 8(b)), the 16 kbps compressed voice of voice ch1 (see FIG. 8(c)), the 16 kbps compressed voice of voice ch2, . . . and the 16 kbps compressed voice (see FIG. 8(d)) of voice ch30 are separately converted to ATM cell form and transferred to the remote party.

As described above, when a voice signal was transferred through an ATM exchange without compression, it normally occupied a bandwidth of 2 Mbps irrespective of whether or not a voice call was taking place or the busy settings. But when voice compression is employed, since the voice bandwidth can be set to ¼ and further such that channels that are not busy can be set beforehand as non-transmitting, a transfer bandwidth much smaller than 2 Mbps is sufficient. However, if voice compression is employed, celling is performed in units of each ch, so, in the case of 16 kbps, the data rate is low, with the result that time is required for the accumulation of data amounting to one cell. Consequently, in order to compile one cell of voice data as shown in FIG. 8(b), (c) and (d), 125 $\mu$sec×(47 byte÷¼)=23.5 msec is required. Including the time required for voice compression processing, this gives 50 msec or more, imposing a very large transfer delay.

Also, conventionally, when for example a call is made between telephone set 50-1 and telephone set 50-5, the telephone call originating from telephone set 50-1 is transferred in the sequence: PBX 30a, ATM exchange 10a, ATM exchange 10b, PBX 30b; on determining that this PBX 30b is a relay exchange, in accordance with the result of this determination, the call is then further transferred through relay route 35 in the order: ATM exchange 10b again, ATM exchange 10c, and PBX 30c, after which it arrives at telephone set 50-5. In this case, all the processing of call connection information is performed between PBXs 30a, 30b, and 30c.

Thus, in the case of relay-exchanging, celling and decelling are executed every time relay-exchanging is performed, irrespective of whether voice compression has been applied or not; thus, as the number of times of relay-exchanging increases, the delays accumulate. Consequently, while this may still be satisfactory in the case where voice compression is not applied, if voice compression is applied, in addition to the large delay which is inherent in celling for each channel as described above, there is superimposed the delays resulting from performing celling every time relay-exchanging takes place; as a result, service delays sometimes reached levels that could not be ignored from the point of view of speech quality.

Thus, with the prior art system described above, when performing transfer of non-compressed voice, frame signals were directly converted to cell form before being transferred between the PBX/ATM exchanges, but, when performing compressed voice transfer, the compressed voice in the aforesaid frame signals was converted to cell form for each channel and into TDM frame units of fixed length before being transferred.

In the conventional system described above, there was therefore the problem that, when voice was to be transferred without compression, it was always necessary to reserve bandwidth corresponding to the frame signal between the PBX/ATM exchanges: this adversely affected transfer efficiency.

Also, in the case where transfer was effected after performing voice compression, although the problem of occupation of bandwidth described above did not occur, because celling was effected for each channel, a considerable waiting time was required to accumulate sufficient compressed voice to fill up a TDM frame of fixed length; thus the transfer rate was inevitably lowered due to this celling delay.

Furthermore, with the conventional system described above, when relay-exchanging was performed through a plurality of ATM exchanges, it was necessary to perform celling and decelling every time such relay-exchanging was executed: in particular, in the case of relay-exchanging to transfer compressed voice, the delay of this celling/decelling was superimposed on the delay involved in celling for each channel as described above, corresponding to the number of times that this processing was performed. As a result, the problem arose that transfer delay sometimes reached levels whose effect on service could not be ignored.

Accordingly, an object of the present invention is to provide a voice signal transmitting method and exchange system whereby, in service between telephone sets with an ATM system having a layout that is capable of coping with relay-exchanging, the bandwidth reservation in non-compressed voice transfer can be eliminated and transfer efficiency improved.

A further object of the present invention is to provide a voice signal transmitting method and exchange system wherein, in service between telephone sets in an ATM system having a layout capable of coping with relay-exchanging, the transfer delay resulting from the celling delay in compressed voice transfer and the celling/decelling delay on relay-exchanging can be greatly reduced, enabling excellent speech quality to be maintained.

DISCLOSURE OF THE INVENTION

The first invention of this application comprises: distributing means for distributing a plurality of voice signal channels that are input from a transmission source to each transfer destination remote station; monitoring means for monitoring a speech condition of each of the channels that have been distributed to each remote station; multiplexing means that compresses only the busy channels, of these channels, and that performs multiplexing at fixed time intervals with respect to variable-length multiplexing frames for each remote station; and celling means that convert to ATM cell form, for each remote station, the variable-length multiplexed frames; wherein the plurality of voice signal channels that are input from exchanges etc. are distributed to each remote station, and, of these, only the voice signals of busy channels are compressed, and multiplexed into variable-length multiplexing frames at fixed time intervals, these variable-length multiplexed frames compiled for each remote station being then converted to ATM cells and transferred to each corresponding remote station.

In the first invention, the variable-length multiplexing frame contains at least information identifying the busy condition in each of the voice signal channels, call connection information employed for effecting connection between the exchanges etc., and information of the number of voice signal channels that are multiplexed in that frame.

In the first invention, the ATM cells are cells of AAL (ATM Adaptation Layer) type 5, which are transferred with a predetermined number of the variable-length multiplexed frames inserted into these cells.

Further, the second invention of this application is an exchange system comprising a plurality of PBXs accommodating voice terminals and a plurality of asynchronous mode exchanges that mutually exchange voice signals from the voice terminals that are input through these PBXs, in which cell conversion units are provided between the PBXs and the asynchronous mode exchanges corresponding to these PBXs, wherein the cell conversion units comprise: distributing means for distributing the plurality of voice signal channels that are input from voice terminals at the sending end through corresponding PBXs for each destination PBX; multiplexing means whereby, of the channels distributed for each PBX, only busy channels are compressed, and are multiplexed at fixed time intervals with respect to variable-length multiplexing frames for each PBX; and transfer means that effect transfer by converting the variable-length multiplexed frames compiled for each PBX into ATM cells for each corresponding PBX.

In the second invention, the variable-length multiplexed frame includes at least information identifying the busy condition in each voice signal channel, call connection information that is employed for effecting connection between the PBXs, and information regarding the number of voice signal channels that are multiplexed in that frame.

Also in the second invention, the ATM cells are AAL (ATM Adaptation Layer) type 5 cells, and transfer is effected with a predetermined number of variable-length multiplexed frames inserted in these cells.

In the present invention, a plurality of voice signal channels that are input from a private branch exchange (PBX) or the like are distributed to each remote station and, of these, only busy channels are compressed and multiplexed into multiplexing frames of variable length at fixed time intervals, and the variable-length multiplexed frames compiled for each such remote station are converted into cell form at each corresponding remote station before being transferred. By means of this control, the voice signal is directly transferred to each remote station (PBX etc.), so celling/decelling need only be performed once. In this way, the celling/decelling delay is greatly reduced, enabling excellent speech quality to be maintained.

Also, since, in the multiplexing of compressed voice signals separately to each remote station, variable-length multiplexing frames are employed, and the multiplexing of the voice signals to these variable-length multiplexing frames is executed at fixed time intervals only for busy channels, an increase in transfer efficiency can be expected, since the bandwidth corresponding to the unused channels can be dispensed with, and furthermore, useless waiting time such as is required in the conventional system, in which celling is only commenced after accumulation for each channel of an amount corresponding to one frame, is eliminated; thus, the delay involved in celling itself on voice compression can also be reduced.

BRIEF DESCRIPTION OF THE DRAWINGS

FIG. 2(a)–2(e) are frame layout diagrams given in explanation of ATM celling processing on voice transfer by an ATM system according to the present invention;

FIG. 3(a)–3(c) are frame layout diagrams of another type which can be applied to an ATM system according to the present invention;

FIG. 8(a)–8(d) are frame layout diagrams given in explanation of ATM celling processing on compressed voice transfer in a prior art ATM system.

BEST MODE FOR CARRYING OUT THE INVENTION

Figure 1:
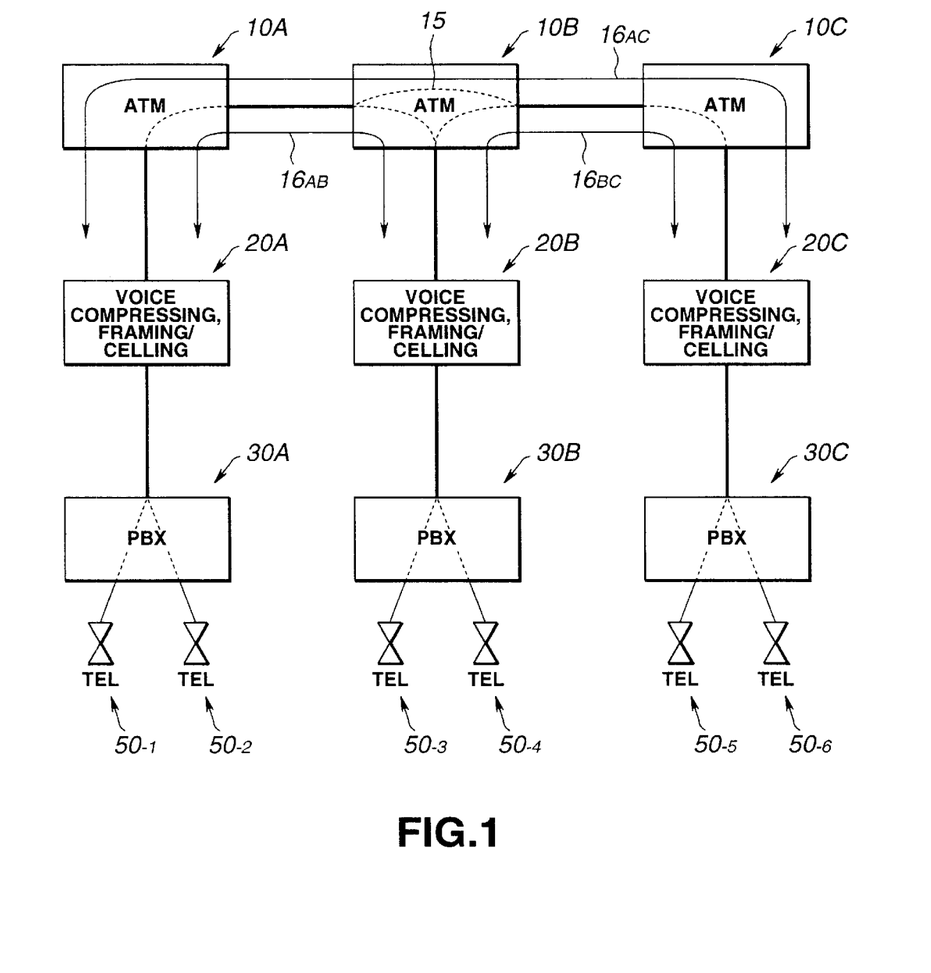
FIG. 1 is an overall layout diagram of an ATM system according to the present invention.

An embodiment of the present invention is described in detail below with reference to the appended drawings. FIG. 1 is an overall layout diagram of an ATM network system according to the present invention. This ATM network system comprises: a plurality of ATM exchanges 10A, 10B, 10C, units 20A, 20B, 20C for voice compression/framing/ATM celling respectively corresponding to ATM exchanges 10A, 10B, 10C, PBXs 30A, 30B, 30C respectively corresponding to voice compression/framing/ATM celling units 20A, 20B, 20C and telephone sets 50-1, 50-2, 50-3, 50-4, 50-5, 50-6 respectively connected to these PBXs 30A, 30B, and 30C.

For convenience in description, the voice compression/framing/ATM celling units 20A, 20B, 20C of this embodiment are described with the configurations as if they were present as adapter devices; however, it would of course be possible for these units 20A, 20B, 20C to be implemented by a construction in which they were actually installed in the corresponding ATM exchanges 10A, 10B, 10C. In this Figure, symbols 16AB, 16BC, and 16AC respectively indicate the channels of PBX 10A and 10B, PBX 10B and 10C, and PBX 10A and 10C, while symbol 15 indicates the relay route in ATM exchange 10B.

Next, the call operation in this ATM system will be described. For example, when a call is made between telephone set 50-1 and telephone set 50-3, the call originating from telephone set 50-1 is transferred in the sequence: PBX 30A, voice compression/framing/ATM celling unit 20A, ATM exchange IOA, ATM exchange 10B, voice compression/framing/ATM celling unit 20B, and PBX 30B, before arriving at telephone set 50-3. The processing steps in this call operation until the voice signal that is input from PBX 30A is converted to ATM cells in voice compression/framing/ATM celling unit 20A will now be described with reference to FIG. 2.

In this case, the voice signal that is sent from telephone set 50-1 is input in TTC 2 Mbps frame mode shown in FIG. 2(a) from telephone set 50-1 to voice compression/framing/ATM celling unit 20A. This frame is divided such that the ch (1 to 15) constituting the front half of the frame are for connection to remote PBX 30B while the ch constituting the remaining half (16 to 30) are for connection to remote PBX 30C. Also, the call control information is shared and is held in the call control information ch at the head of this frame.

The voice signal that is input to voice compression/framing/ATM celling unit 20A is subjected to voice compression in each ch. Next, this compressed voice is collected at each remote station (each remote PBX). Of these, turning our attention to the collected voice signals (ch1–ch15) destined for remote PBX 30B, these voice signals are multiplexed into a variable-length TDM frame in the mode shown for example in FIG. 2(b) at fixed time intervals to remote PBX 30B.

Figures 2B, 2C:
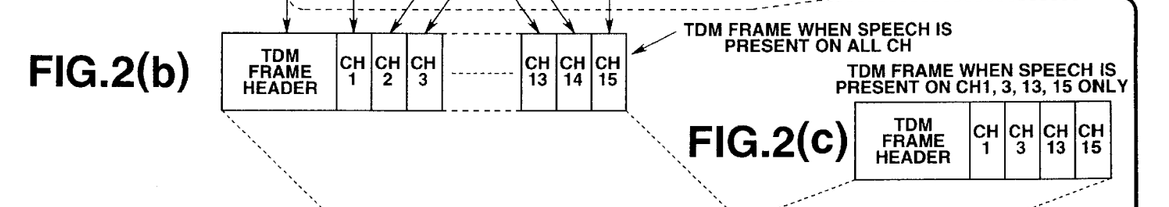

FIG. 2(b) shows .in particular the multiplexing structure of a variable-length TDM frame when all ch are busy; the mode shown in FIG. 2(c) is the multiplexing structure of this TDM frame when service is being performed which does not use all the ch, for example service with only 1, 3, 13, 15 ch.

As can be seen from FIG. 2(b) "TDN frame when speech is present on all ch" and FIG. 2(c) "TDM frame when speech is present only on ch1, ch3, ch13 and ch15", the variable-length TDM frame is divided into a TDM frame header, in which is accommodated the control information, and a data area, in which is accommodated the compressed voice, so that the frame transfers only the voice of the busy ch.

By employing such a variable-length frame, if there are many ch with no speech and no sound (i.e. transmitted voice below a prescribed level), this can be crafted to exclude such ch and pack the other voice ch, on which speech is present, towards the header-end of the frame, thereby enabling the frame length to be shortened. Thus, the chief merit of the variable-length TDM frame is that it enables the frame length to be shortened so that it carries only busy ch.

The detection of ch on which there is no speech or no sound as described above (i.e. the transmitted voice is below a prescribed level) can be achieved by analysis of the call control information or voice ch data monitoring etc. Consequently, taking the opposite viewpoint, the TDM frame header at the head of this variable-length TDM frame contains transmitted voice ch identification information (identification of voice ch that are being multiplexed), frame length identification information, originating node information (information of originating voice compression/framing/ATM celling unit), synchronization bit, frame number (for detection of frame dropouts etc.) and inter-PBX call control information etc.

Figure 2D:
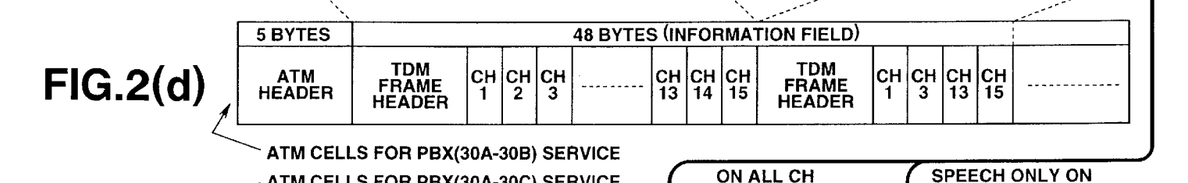
Figure 2E:
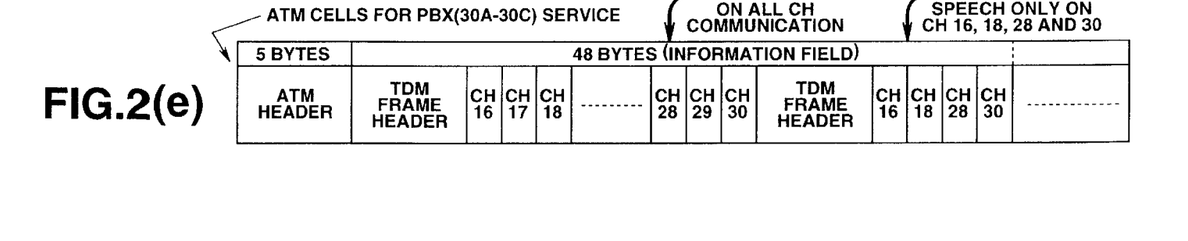

In this way, ATM cells whose address destines them for voice compression/framing/ATM celling unit 20B in the mode shown in FIG. 2(d) are compiled by tuning the variable-length TDM frame that was thus compiled. These ATM cells are then transferred through ATM exchange 10A and ATM exchange 10B to the voice compression/framing/ATM celling unit 20B that has jurisdiction over PBX 30B to which the remote party's telephone set 50-3 is connected.

Voice compression/framing/ATM celling unit 20B returns this variable-length frame that has been transferred, by the opposite routing to that which was used when sending, to the original TTC 2 Mbps frame, and transfers this to PBX 30B which is under its jurisdiction; thence it arrives at telephone set 50-3, which is that of the remote party for the call.

In contrast, in the case of service with for example telephone set 50-5 connected to PBX 30C, the voice signal from telephone set 50-1 is transferred by processing identical with the above but using the ch (16 to 30) of the remaining half, which is provided for connection to PBX 30C.

Specifically, of the voice signals from telephone set 50-1 that are input to voice compression/framing/ATM celling unit 20A, the collected voice signals (ch1–ch15) that are destined for remote PBX 30C are multiplexed into a variable length TDM frame going to remote PBX 30C in the mode shown for example in FIG. 2(d) at fixed time intervals.

Thus, when all the ch are busy, all these ch are multiplexed in sequence; if there are some ch that are not busy or without sound (i.e. the transmitted voice is below a prescribed level), these ch are omitted and the other busy voice ch (in this example, 16, 18, 28 and 30 ch) are multiplexed, packed towards the header end of the frame.

The TDM frame header at the head of this variable-length TDM frame contains: transmitted voice ch identification information (identification of the voice ch that is multiplexed), frame length identification information, originating node information (information of the originating voice compression/framing/ATM celling unit), synchronization bit, frame number (for detection of frame dropouts), and inter-PBX call control information etc.

ATM cells of address destined for voice compression/framing/ATM celling unit 20C of the mode shown in FIG. 2(c) are thus compiled by tuning the variable-length TDM frame that has been compiled in this way. These ATM cells are then transferred from ATM exchange 10A to ATM exchange 10B. ATM exchange 10B uses the addresses of the ATM cells that it receives to directly effect relay transfer of these ATM cells through relay route 15 to ATM exchange 10C.

Further, ATM exchange 10C transfers these ATM cells that it has received to framing/ATM celling unit 20C. Next, voice compression/framing/ATM celling unit 20B returns the ATM cells (variable length frame) that it has received to the original TTC 2 Mbps frame by a routing opposite to that which was used when the cells were sent, so that they pass through PBX 30B, which is under its jurisdiction, and arrive at telephone set 50-3, which is that of the call remote party.

Thus, with the present invention, since a direct connection is achieved by means of the ATM cells with the final PBX to which a direct connection is desired, ATM celling/decelling need be performed only once, so the delay time produced by relay transfer no longer poses a particular problem.

Also, thanks to the use of a variable-length TDM frame system in which compressed voice is bundled at each remote station (each remote PBX), and transfer is effected at fixed time intervals, but only of the busy ch, compared with the case where ATM celling is commenced only after a fixed amount of compressed voice has been accumulated, the ATM celling processing time itself can be shortened, and, by means of the synergetic effect with the reduction in celling/decelling delay involved in relay transfer described above, compressed voice transfer with little delay can be implemented using an ATM network. Thus, with the present system in which a variable-length TDM frame is employed, and this is combined with transferring only busy ch, transfer efficiency can be obtained that is much better than that if a fixed bandwidth is always employed.

The embodiment described above is an example in which variable-length TDMA frames are inserted into ATM cells. Apart from this, as another embodiment of the present invention, a method could be used in which a predetermined number of variable-length TDM frames are collected and used to constitute an AAL5 cell group.

Figure 3A:
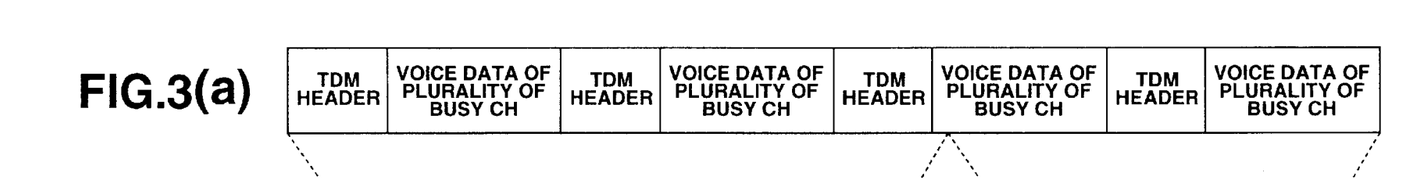

FIG. 3 is a diagram showing an image of cell processing when celling of a plurality of variable-length TDM frames is performed using AAL5-type ATM cells. This Figure shows in particular an example in which four variable-length TDM frames form a group (see FIG. 3(a)), which is generated as an AAL5 cell group.

Figure 3B:
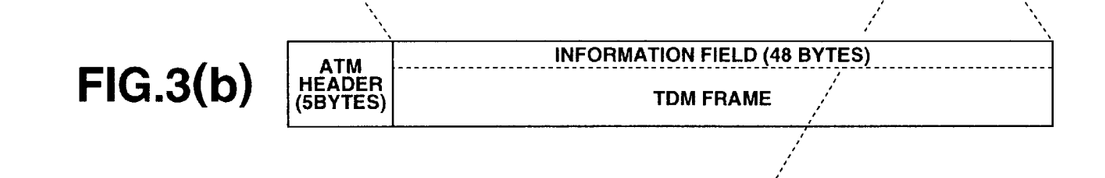

As shown in FIG. 3(b) and (c), a single ATM cell of the AAL5 type is constituted of a 5-byte ATM header and a 48-byte information field. Using these ATM cells, first of all, into the first ATM cell, of the four variable-length TDM frames referred to above, TDM frames as far as some point in the third TDM frame are inserted (see FIG. 3(b)); then, into the next ATM cell, there are inserted the remainder of the TDM frames i.e. from some point on the third variable-length TDM frame up to the end of the fourth variable-length TDM frame (see FIG. 3(c)). It should be noted that, in the generation of this second ATM cell, there is added for example an 8-byte AAL5 trailer (this indicates the end of the group); furthermore, conversion into ATM cell form (see FIG. 3(c)) is effected by adjusting the amount of data at the PAD such that the amount of data constitutes an integral multiple of 48 bytes.

Figure 3C:
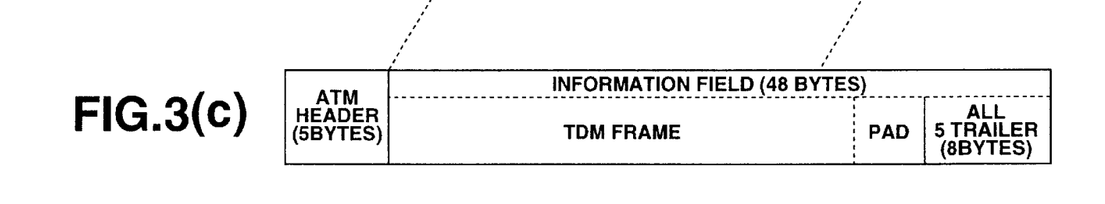

With this method, the head of the variable-length TDM frame can be identified from the ATM header information, so there is no need to provide a synchronization bit within the variable-length TDM frame; furthermore, since this is AAL5, the circuitry can be simplified.

It should be noted that the embodiments described above are merely examples and there is no particular restriction on the interface with the PBXs or the construction of the variable-length frame header. Apart from this, the present invention may be modified and applied in various ways without departing from its essence as described above.

As described above, with the present invention, a plurality of voice signal channels that are input from PBXs etc. are distributed to each remote station, of these, only busy channels are compressed, and multiplexed into variable-length multiplexing frames at fixed time intervals, and these variable-length multiplexed frames that are compiled for each remote station are transferred by being converted into cell form for each corresponding remote station, so the voice signals are directly transferred to each remote station; as a result, relay transfer can be substantially dispensed with, and celling/decelling delay can be restricted to that involved in performing this once only, thereby enabling excellent speech quality to be maintained.

Also, in the bundling and multiplexing of the compressed voice to each remote station, variable-length TDM frames are employed and, in addition, multiplexing processing is arranged to be performed at fixed time intervals only on busy channels, so compressed voice transfer with excellent transfer efficiency and very little delay can be achieved, thus providing the excellent benefit of contributing greatly to improvement of speech quality.

INDUSTRIAL APPLICABILITY

With the present invention, the plurality of voice signal channels input from PBXs etc. are distributed into those for each remote station, and, of these, only busy channels are compressed and multiplexed into variable-length multiplexing frames at fixed time intervals, these variable-length multiplexed frames compiled for each remote station being converted to cell form and transferred to each corresponding remote station; the voice signals are thereby directly transferred to each remote station; as a result, relay transfer can be substantially dispensed with and celling/decelling delay can be limited to that involved in only a single such step, thereby enabling excellent speech quality to be maintained; this is therefore particularly suited to calls between telephone sets in an ATM system with a large number of relay-exchanging nodes.

We claim:

1. A voice signal transmitting method comprising:

distributing means for distributing a plurality of voice signal channels that are input from a transmission source to each transfer destination remote station;

monitoring means for monitoring a speech condition of each of the channels that have been distributed to each remote station;

multiplexing means that compresses only busy channels of the channels and that performs multiplexing at fixed time intervals with respect to variable-length multiplexing frames for each remote station; and celling means for converting to ATM cell form, for each remote station, the variable-length multiplexed frames;

wherein the plurality of voice signal channels that are input from the transmission source are distributed to each remote station, and, of these, only the voice signals of busy channels are compressed, and multiplexed into variable-length multiplexing frames at the fixed time intervals, the variable-length multiplexed frames compiled for each remote station being then converted to ATM cells and transferred to each corresponding remote station.

2. A voice signal transmitting method according to claim 1, wherein each variable-length multiplexing frame contains at least information identifying a busy condition in each of the voice signal channels, call connection information employed for connecting the transmission source to each transfer destination remote station, and information of the number of voice signal channels that are multiplexed in own frames.

3. A voice signal transmitting method according to claim 1 or claim 2, wherein the ATM cells are cells of AAL (ATM Adaptation Layer) type 5, which are transferred with a predetermined number of the variable-length multiplexed frames inserted into these cells.

4. An exchange system comprising a plurality of PBXs accommodating voice terminals and a plurality of asynchronous mode exchanges that mutually exchange voice signals from the voice terminals that are input through the PBXs, in which cell conversion units are provided between the PBXs and the asynchronous mode exchanges corresponding to these PBXs, wherein the cell conversion units comprise:

distributing means for distributing a plurality of voice signal channels that are input from voice terminals through corresponding PBXs for each destination PBX;

multiplexing means for multiplexing whereby, of the channels distributed for each PBX, only busy channels are compressed, and are multiplexed at fixed time intervals with respect to variable-length multiplexing frames for each PBX; and transfer means that effects transfer by converting the variable-length multiplexed frames compiled for each PBX into ATM cells for each corresponding PBX.

5. An exchange system according to claim 4, wherein each variable length multiplexed frame includes at least information identifying a busy condition in each voice signal channel, call connection information that is employed for effecting connection between the PBXs, and information regarding the number of voice signal channels that are multiplexed in own frame.

6. An exchange system according to claim 4 or claim 5, wherein the ATM cells are AAL (ATM Adaptation Layer) type 5 cells, and transfer is effected with a predetermined number of variable-length multiplexed frames inserted in the cells.

* * * * *